United States Patent
Mukherjee et al.

(10) Patent No.: US 10,552,140 B2
(45) Date of Patent: Feb. 4, 2020

(54) AUTOMATED IDENTIFICATION OF DEPLOYMENT DATA FOR DISTRIBUTING DISCRETE SOFTWARE DELIVERABLES

(71) Applicant: Oracle International Corporation, Redwood Shores, CA (US)

(72) Inventors: Prasun Mukherjee, Kolkata (IN); Pravas Sudhakar Naik Bhagat, Bangalore (IN); Jeevan Selvan Job John, Bangalore (IN); Russell Ashley Broom, Atlanta, GA (US); Ricarda Heuss, Berlin (DE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/885,026

(22) Filed: Jan. 31, 2018

(65) Prior Publication Data
US 2019/0235850 A1    Aug. 1, 2019

(51) Int. Cl.
*G06F 8/65*    (2018.01)

(52) U.S. Cl.
CPC ................................. *G06F 8/65* (2013.01)

(58) Field of Classification Search
CPC ....................................................... G06F 8/71
See application file for complete search history.

(56) References Cited

U.S. PATENT DOCUMENTS

| 5,519,866 | A  | * | 5/1996  | Lawrence | G06F 8/48  |
|           |    |   |         |          | 717/162    |
| 5,617,533 | A  | * | 4/1997  | Wu       | G06F 8/71  |
|           |    |   |         |          | 714/38.1   |
| 6,536,037 | B1 | * | 3/2003  | Guheen   | G06F 8/71  |
|           |    |   |         |          | 703/2      |
| 6,952,823 | B2 | * | 10/2005 | Kryloff  | G06F 8/658 |
|           |    |   |         |          | 717/170    |

(Continued)

OTHER PUBLICATIONS

How do I Break up a Project into Smaller Deliverables? , Atlassian, Clearcomputing NA, https://community.atlassian.com/t5/Jira-questions/How-do-I-break-up-a-project-into-smaller-deliverables/qaq-p/73821, Aug. 18, 2015, pp. 1-2.

(Continued)

*Primary Examiner* — Matthew J Brophy
(74) *Attorney, Agent, or Firm* — Kilpatrick Townsend & Stockton LLP (57) ABSTRACT

Methods and systems are disclosed for defining deployment data that identify a manner in which to divide a software package of source code deliverables into smaller discrete software package. A triggering event occurring in response to a modification of one or more source code deliverables causes a set of source code deliverables to be identified. One or more particular metadata identifiers associated with the modified one or more source code deliverables may be used to define a group of source code deliverables. The group of source code deliverables includes a subset of the set of source code deliverables that may also be associated with the one or more particular metadata identifiers. One or more (Continued)

packaging rules may facilitate defining deployment data identifying package transmissions for the group of source code deliverables. The deployment data may then be output to one or more devices.

20 Claims, 5 Drawing Sheets (56) References Cited

U.S. PATENT DOCUMENTS

| | | | | |
|---|---|---|---|---|
| 7,620,885 | B2* | 11/2009 | Moulckers | G06F 8/34 715/201 |
| 7,975,264 | B2* | 7/2011 | Sriram, I | G06F 8/658 717/169 |
| 8,261,353 | B2* | 9/2012 | Hirsave | G06F 21/577 713/152 |
| 8,819,202 | B1* | 8/2014 | Carolan | H04L 41/5054 709/223 |
| 8,904,005 | B2* | 12/2014 | Ferris | G06F 9/5072 709/203 |
| 8,972,963 | B2* | 3/2015 | Baset | G06F 8/658 717/168 |
| 9,563,417 | B2* | 2/2017 | Jha | G06F 8/65 |
| 9,569,204 | B2* | 2/2017 | Mansour | G06F 8/447 |
| 10,027,744 | B2* | 7/2018 | Kim | G06F 9/5061 |
| 10,162,968 | B1* | 12/2018 | Kumar | H04L 9/0825 |
| 2005/0229174 | A1* | 10/2005 | Westendorf | G06F 8/71 717/175 |
| 2005/0289536 | A1* | 12/2005 | Nayak | G06F 8/61 717/174 |
| 2008/0172649 | A1* | 7/2008 | Bisso | G06F 8/65 717/121 |
| 2009/0193409 | A1* | 7/2009 | Dave | G06F 8/65 717/173 |
| 2011/0010702 | A1* | 1/2011 | Vrushabendrappa | G06F 8/61 717/177 |
| 2012/0066681 | A1* | 3/2012 | Levy | G06F 9/5027 718/1 |
| 2012/0131193 | A1* | 5/2012 | Ferris | G06F 9/5072 709/226 |
| 2012/0159470 | A1* | 6/2012 | Yang | G06F 8/61 717/175 |
| 2013/0232497 | A1* | 9/2013 | Jalagam | G06F 9/5072 718/104 |
| 2014/0089896 | A1* | 3/2014 | Mansour | G06F 8/447 717/122 |
| 2014/0351443 | A1* | 11/2014 | Tang | G06F 9/45533 709/226 |
| 2015/0007165 | A1* | 1/2015 | Zhao | G06F 8/61 717/174 |
| 2015/0160939 | A1* | 6/2015 | Filatov | G06F 8/60 713/187 |
| 2015/0234848 | A1* | 8/2015 | Weinstein | H04L 9/3239 707/698 |
| 2015/0242204 | A1* | 8/2015 | Hassine | H04L 67/00 717/121 |
| 2015/0378921 | A1* | 12/2015 | Karippara | G06F 9/45533 710/308 |
| 2016/0274885 | A1* | 9/2016 | Srinivasan | G06F 8/65 |
| 2016/0274906 | A1* | 9/2016 | Srinivasan | G06F 8/71 |
| 2017/0004182 | A1* | 1/2017 | Simpson | G06F 16/248 |
| 2017/0310745 | A1* | 10/2017 | Kim | G06F 9/5061 |
| 2018/0196665 | A1* | 7/2018 | Yao | G06F 9/44521 |
| 2018/0316754 | A1* | 11/2018 | Kim | G06F 9/5061 |
| 2019/0265959 | A1* | 8/2019 | Salameh | G06F 8/61 |

OTHER PUBLICATIONS

Tutorial—Planning and Estimating Work for an Agile Team, Atlassian, https://confluence.atlassian.com/agile/jira-agile-user-s-guide/jira-agile-tutorials/tutorial-planning-and-estimating-work-for-an-agile-team?_ga=2.249051271.1430976016.1505206385-697565752.1505206385, last modified on Feb. 23, 2015, pp. 1-7.

* cited by examiner

AUTOMATED IDENTIFICATION OF DEPLOYMENT DATA FOR DISTRIBUTING DISCRETE SOFTWARE DELIVERABLES

FIELD

The present invention relates generally to the automatic identification of discrete packages of software deliverables, and more particularly to automatically generating deployment data defining one or more discrete packages for transmitting executable software deliverables.

BACKGROUND

Software development teams often support multiple software applications and tools across many different domains. The complexity of modern software and the interdependent nature of various applications and/or tools may induce equally complex software updates to support an entire software environment. For example, adding a plurality features and bug fixes to a docket management application may generate an update that includes updating a plurality of applications on which the docket management application depends (e.g. a word processor, libraries, a web browser, etc.). Development devices often distribute a large software update that includes the files to update a software application and the dependent software. Large software updates tie up the resources of client devices including bandwidth, processing time, and downtime when downloading and installing the software update. Further, some client devices may not operate some of the software being updated. For example, a client device may operate the docket management application, but not the web browser. In that case, the large software update may disrupt client devices with excessive processing time in downloading and installing a software update, some of which provides updates to software the client device does not operate. Further, the extra code in a software update may modify shared libraries used by other applications of the client device. Once modified other application may behave erratically or cease to operate. Accordingly, there is a need in the art to identify source code deliverables to include in a plurality discrete software packages that may be independently transmitted and installed.

SUMMARY

A method is disclosed for the automatic identification of source code deliverables to include in software packages as selected from a set of interdependent source code deliverables. The method begins with the detection of a triggering event indicating that a particular source code deliverable has been modified. In response to detecting the triggering event, a set of source code deliverables are identified. Each source code deliverable may include metadata, executable content, and a file, element, and/or an object. The method continues by identifying one or more particular metadata identifiers associated with the particular source code deliverable. A group of source code deliverables is then defined. The group of source code deliverables may include metadata and a subset of the set of source code deliverables, where each source code deliverable in the subset is associated with the one or more particular metadata identifiers. The method continues where one or more packaging rules for defining the content of a package transmission are identified. The packaging rules may be used to generate deployment data that identifies for each package transmission of one or more package transmissions, one or more of the group of source code deliverables to be included in the package transmission. The method concludes as deployment data is output through an interface of a computing device.

A system is disclosed for the automatic identification of source code deliverables to include in software packages as selected from a set of interdependent source code deliverables. The system begins with the detection of a triggering event indicating that a particular source code deliverable has been modified. In response to detecting the triggering event, a set of source code deliverables are identified. Each source code deliverable may include metadata, executable content, and a file, element, and/or an object. The system continues by identifying one or more particular metadata identifiers associated with the particular source code deliverable. A group of source code deliverables is then defined. The group of source code deliverables may include metadata and a subset of the set of source code deliverables, where each source code deliverable in the subset is associated with the one or more particular metadata identifiers. The system continues where one or more packaging rules for defining the content of a package transmission are identified. The packaging rules may be used to generate deployment data that identifies for each package transmission of one or more package transmissions, one or more of the group of source code deliverables to be included in the package transmission. The system concludes as deployment data is output.

A computer-readable media that include instructions that are executed by one or more processors to provide a process is disclosed for the automatic identification of source code deliverables to include in software packages as selected from a set of interdependent source code deliverables. The process begins with the detection of a triggering event indicating that a particular source code deliverable has been modified. In response to detecting the triggering event, a set of source code deliverables are identified. Each source code deliverable may include metadata, executable content, and a file, element, and/or an object. The process continues by identifying one or more particular metadata identifiers associated with the particular source code deliverable. A group of source code deliverables is then defined. The group of source code deliverables may include metadata and a subset of the set of source code deliverables, where each source code deliverable in the subset is associated with the one or more particular metadata identifiers. The process continues where one or more packaging rules for defining the content of a package transmission are identified. The packaging rules may be used to generate deployment data that identifies for each package transmission of one or more package transmissions, one or more of the group of source code deliverables to be included in the package transmission. The process concludes as deployment data is output.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

A distributed development environment is disclosed for the automatic identification of source code deliverables, selected from a set of interdependent source code deliverables, to be included in a software package. In some examples, a distributed development environment may use concurrent versioning systems to manage versions of a software project in development. A concurrent versioning system is a software development system that tracks the state of the deliverables of a project. When a file is modified, the system will update a version identifier associated with the file and the version identifier of the project. In addition, the concurrent versioning system may persistently track previous versions of the file in case the modification introduces unforeseen faults into the project that makes the previous version of the file more suitable then the modified version. In some examples, a concurrent versioning system provides a central repository for the versions of the software project in development, thereby enabling access by remote devices. Remote development devices may obtain a copy of one or more source code deliverables (i.e. check-out one or more source code deliverables), modify those deliverables, and store the modified one or more source deliverables back in the repository (i.e. check-in the modified or more source code deliverables).

Storing the modified one or more source code back in the repository may be more complicated when the changes to the one or more source code deliverables affect other source code. For example, changes to the inputs of a function in a source code deliverable may affect other source code that calls the function. In some examples, a remote development device may be warned when modifications to a source code deliverable affect other source code deliverables by displaying the modified source code deliverable side-by-side with the affected source code deliverables. In other examples, the system may automatically update the affected source code deliverables through an iterative approach. The changes are "committed" once the source code deliverables associated with the modified one or more source code deliverables are updated. The concurrent version system may increment the version identifier associated with the source code deliverables that were modified (e.g. the one or more source code deliverables and the affected other source code deliverables) and the version identifier of the software project. A development device may generate project data that identifies each of the modified source code deliverables. The project data may be transformed into a software update or patch that can be transmitted to one or more client device to update a version of the software being used by client devices (e.g. end-users of the software).

Transmitting substantial software updates may be problematic for client devices. Unpacking and installing large software updates uses large amounts of resources such as processing power, bandwidth, and processing time. Large updates also take longer to install thereby inducing longer periods of system downtime for client devices. In some examples, client devices may not use some of the software that is included in the software update. Superfluous or extraneous software may cause critical system faults or even system crashes. For example, a software update may unnecessarily modify system deliverables on which other application depend causing these other applications to become inoperable. The extraneous software may be more likely to crash the computing system when operating system and system level deliverables are affected (e.g. the registry, dynamic link libraries, and the like).

Some examples of the present disclosure include methods and systems for applying intelligence to identify discrete deliverables (e.g., files, elements and/or objects with executable code) to include in individual software packages generated in response to detecting software updates. An update of code in a single deliverable may affect one or more other deliverables (e.g., an update to a variable list to be included in a function call can affect other code that calls the function). Some techniques can apply rules to determine whether to deliver a comprehensive package of code in a single software package or whether to alternatively send one or more smaller software packages (e.g., potentially sending only an incomplete subset of a larger set of related code and/or dividing deliverables across multiple packages, each configured to be transmitted and installed independently. Smaller, software packages enable fast transmission and installation that corresponds to reduced bandwidth, processing requirements, and system downtime.

Thus, methods and systems are disclosed for defining deployment data that identify a manner in which to divide a software package of source code deliverables into smaller discrete software packages. The process begins by detecting a triggering event such as when a remote development device modifies one or more source code deliverables of a software project. In some examples, detecting the triggering event includes detecting a command issued by the remote development device. In some examples, detecting the triggering event includes detecting that a deliverable has been saved to (e.g., as an initial save or an update) a central repository. The central repository can include a data store accessible to one or more development devices and storing a set of source-code deliverables (e.g. files, elements, and/or objects each of which may include executable content). The central repository can further store metadata associated with each of one or more of the set of deliverables, which may be included in the deliverable(s) and/or stored separately from the deliverable(s).

In response to detecting the triggering event, one or more particular metadata identifiers from the modified one or more source code deliverables are detected. The one or more particular metadata identifiers may be indicative of related source code deliverables. Specifically, the related source code deliverables may be identified as each deliverable that shares all, at least one, or a defined combination of the one or more particular metadata identifiers with the modified one or more source code deliverables.

The one or more particular metadata identifiers may be indicative of (for example) contents of a source code deliverable (e.g. variables, functions, documentation, annotations, naming convention of the contents, or the like), properties of a source code deliverable (e.g. naming convention of the deliverable, size, type, owner, purpose, date/time the deliverable was created, last time the deliverable was modified, or the like), or metadata (e.g. the number of particular metadata identifiers, specific particular metadata identifiers present, or the like). Therefore, the metadata can facilitate identifying a group of source code deliverable that include the updated deliverable(s) and one or more related deliverables. Each source code deliverable in the group can relate to (for example) a same product, feature, folder structure, library, function, and/or update timestamp.

However, as previously indicated, the group of source code deliverables need not be transmitted in full in a single package transmission to user devices. Rather, one or more packaging rules may be applied to the group of source code deliverables to identify deployment data (defining a number of package transmissions and/or which deliverable(s) from the group to include in each package transmission). A package transmission may be a software package that includes one or more source code deliverables in a form ready to be transmitted to client device.

In some examples, the one or more rules may organize source code deliverables into packages based on a size threshold for each deliverable (e.g., indicating that a package is to include a single deliverable when the deliverable exceeds the size threshold), a size threshold for the package (e.g., separating deliverables such that each package does not exceed the size threshold), a relationship between the deliverables (e.g., indicating that a package is to include the deliverables sharing a common relationship), a frequency in which a deliverable is transmitted or updated (e.g., indicating that a package is to include a single deliverable when the deliverable exceeds the frequency threshold) a type of deliverable (e.g., indicating that a package is to include the deliverables that are of the same type), a type of package (e.g., indicating that a package is to include the deliverables associated with the package's type), as software application or tool associated with the group of source code deliverables (e.g., indicating that a package is to include the deliverables associated with the software application or tool), any combination thereof, or the like.

In some examples, a first rule may be superseded by a second rule with a higher priority. For example, a first rule may define a package to include deliverables associated with a particular feature being added to an application. A second, higher priority rule may indicate source code deliverables of a certain size threshold are to be packaged alone. Thus, the deployment data may identify that source code deliverables that exceed the size threshold are placed into separate packages while any remaining deliverables for the feature being added may be packaged together.

In an illustrative example, a first software update may include a set of source code deliverables to update a first application and a set of source code deliverables to fix bugs in a second application. Including both sets of source code deliverables may result in a large software update that uses significant bandwidth and processing resources to apply. A first rule may be applied to separate the software update into two packages. A first package may include the portions of the update that update the first application, and a second package may include the remaining portions of the update to fix bugs in the second application. Each package may be significantly smaller than the original software update and may be transmitted and installed quickly and independent from other packages.

The defined deployment data may then be output. In some examples, the deployment data may be transmitted to a development device, the other development device, a server (e.g. the server hosting the remote repository), one or more client devices, or the like, such that it can (for example) be displayed at an interface of the receiving device. In some examples, the deployment data may be archived for later use. In other examples, the deployment data may be used to automatically generate the package transmissions and transmit them to one or more devices. Once the deployment data is output the process terminates.

In some illustrative examples, the one or more packaging rules may be used to define package transmissions based on a size threshold (e.g. a size of the deliverable or a size of the package) to prevent transmitting a comprehensive update that is too large to be efficiently applied. A first rule of the one or more rules may determine that a group of source code deliverables is too large to place in a single package transmissions. The first rule may indicate that a package transmission cannot exceed a size threshold (e.g. 128 Mb) or that a source code deliverable over a size threshold is to be placed in a separate package transmission. For example, the first rule may be used to define package transmissions such that source code deliverables are added to the package transmission until the size threshold is met (or at least not exceeded). In other examples, the first rule may be used to define separate packages for each source code deliverable exceeding the size threshold of the first rule.

In some examples, a combination of a deliverable size threshold and package size threshold may be employed based on a type of deliverable. A first rule may indicate that source code deliverables exceeding a size threshold and related to the operating system are to be packaged separately from the remainder of an update. A second rule may indicate that source code deliverables exceeding a size threshold and related to a library are to be packaged together despite exceeding the size threshold. A third rule may indicate that no package may exceed a size threshold (e.g. 128 Mb). Thus, the operating system deliverable may be contained in a first package transmission, three of the library deliverables in a second package transmission (so as to not exceed the package size threshold), and the remaining three library deliverables in a third package transmission. The rules may be employed to define deployment data that identifies a number of package transmissions that together may provide the same large update, but may be separately transmitted to and installed by one or more client devices.

In other illustrative examples, the a remote development device updates source code deliverables associated with an application that is frequently the subject of software updates. A first rule may indicate that a first software package is to only include the updated code when the update is of a defined class (e.g. related to a frequently updated application). Related deliverables may then be included in one or more second software packages. A second rule that is more highly prioritized in a hierarchy may identify exceptions for the first rule. Thus, when it is determined that the update corresponds to the defined class and that the exceptions do not apply, deployment data can be defined that indicates that a single first package including only the updated deliverable is to be transmitted. The deployment data can also indicate that one or more second packages include other related deliverables. The first package may then be quickly downloaded and installed so that the client device. Although presented as separate examples, the one or more rules may be applied in any order and in any combination. For example, the size threshold rules and the frequency rules may each be applied to a group of source code deliverables.

As used herein, the term software "update," "upgrade," and "patch" (and the like) refers to any instruction set or code set that modifies a version of a software application. The modification may add or remove features, add or remove applications, and/or fix software faults or errors (e.g. bugs). The modifications may be to an application or a plurality of applications at once. The modification may be to an application across a domain (e.g. a computing device) or multiple domains (e.g. a distributed application executing on multiple computing device). The modification may be to one or more instructions, deliverables, modules or the like.

As used herein the term source code deliverable refers to a collection of software instructions that may be combined to make up a software application. The instructions may be expressed in one or more programming languages (e.g. Java, C, C++, or a combination of the like), as compiled or un-compiled instructions, in an intermediate language (IL), in bytecode, as objects, or the like. A source code deliverable, may be a file, element, object, module, or the like. The term source code deliverable is not intended to be limiting to just source code, but instead may refer to any software module or instructions, in any state, that can be assembled into a larger software application, program, and/or tool.

Figure 1:
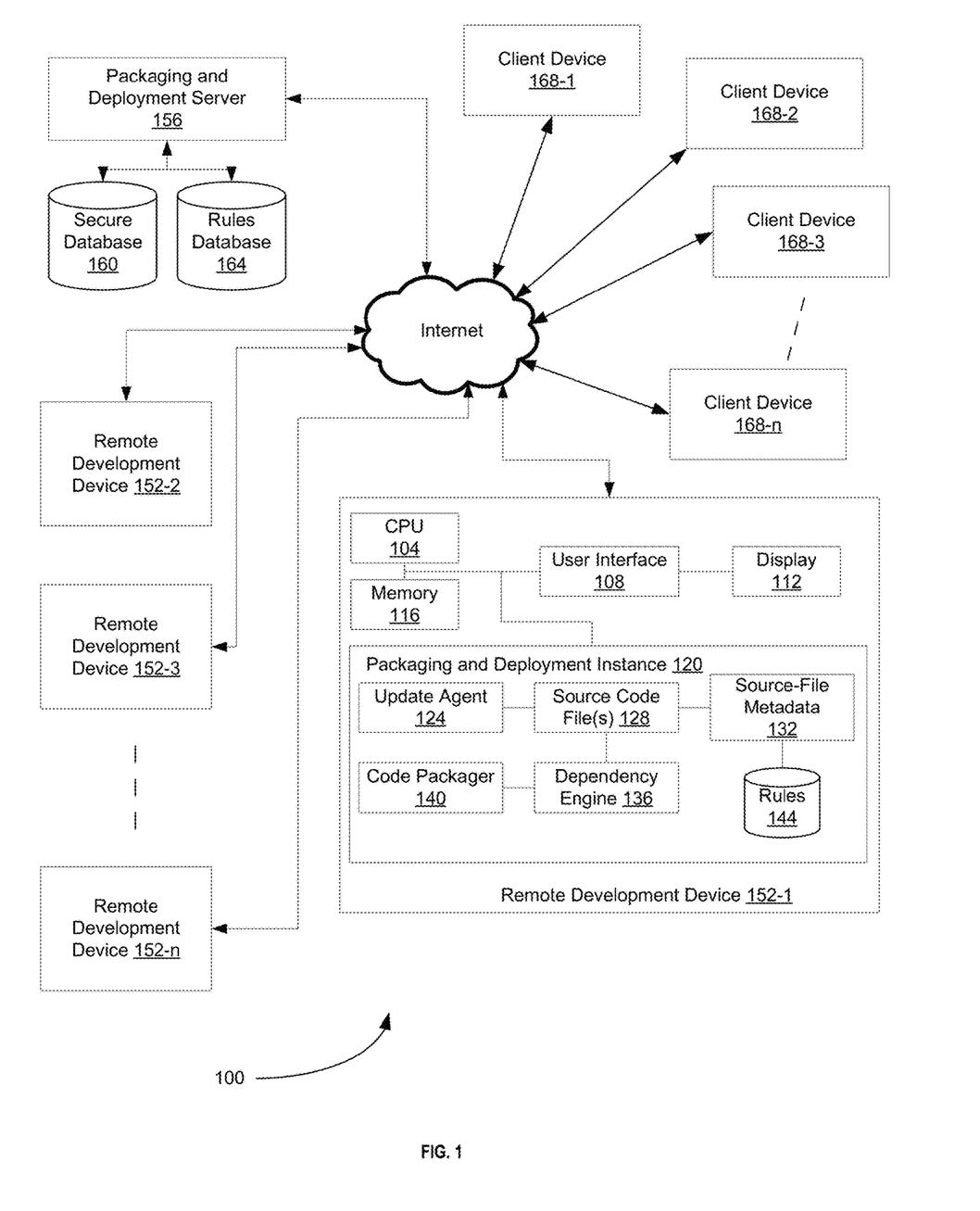
FIG. 1 illustrates an exemplary distributed development environment.

Turning to FIG. 1 depicting an exemplary networked environment 100 of a distributed development environment. The distributed development environment may be made up of one or more remote development devices 152-1, 152-2, 152-3, . . . 152-n in communication with each other over a network (e.g. the internet, WAN, or the like). Although four of such devices are depicted, the distributed development environment may include any number of such devices. The devices may additional communicate with a central packaging and deployment server 156 and one or more client devices 168-1 . . . 168-n. Packaging and deployment server 156 may operate a concurrent version system to which remote development devices 152 subscribe. Packaging and deployment server 156 may be connected to a secure database 160 which stores source code deliverables associated with new and/or ongoing software development project(s), metadata corresponding to the source code deliverables, and other metadata relating to the project. Packaging and deployment server 156 may also be connected to rules database 164 storing rules for identifying dependencies and the behavior of source code deliverables of new and/or ongoing software development project(s).

Remote development device 152 comprise computing hardware such as a central processing unit (CPU) 104, memory (e.g. ROMs, RAMs, EEPROMs, FLASH, HDDs, and the like) 116, a user interface 108 such as a command line interface or graphical user interface, a display device 112 capable of displaying information to a user, and a packaging and deployment instance 120 in which a developer or user of the device participates in the distributed development environment 100. In some examples, the implementation of device 152 includes specialized hardware that is determined based on the particular implementation of the distributed development environment 100. In other examples, device 152 may employ general purpose computing hardware.

In some examples, the packaging and deployment instance 120, may be implemented as a specialized hardware component of device 152. In those examples, the packing and deployment instance 120 may include the hardware to carry out the functions to develop, package, and deploy software to client devices, such as client devices 168. Thus, packing and deployment instance 120 may incorporate, CPU(s), memory(s), and other such hardware separate from CPU 104, memory 112, etc. In some examples, packing and deployment instance 120 may be implemented as a field programmable gate array, mask programmable gate array, system on chip, or the like. In other examples, the packing and deployment Instance 120 may be implemented as a set of instructions stored in a memory of device 152 and executed by CPU 104.

Packaging and deployment Instance 120 may include a development environment that enables a developer to create, modify/update, and/or delete source code deliverables that are part of a software project. In some examples, the development environment may be an integrated development environment (IDE). In other examples, the development environment may be any software that enables input or modification of textual or visual source code. The remote development environment 152-1 may store the source code deliverables in development in local memory such as in memory 116. In those examples, changes to a source code file may be stored within a local memory. In some examples, the remote development environment 152 may obtain the most recent copy of the source code file for modification from a central remote repository such as from secure database 160 within packaging and deployment server 156. In other examples, the remote development environment 152 may obtain the most recent version of the source code file from another remote development device such as any of devices 152-2, 152-3, 152-n, etc. In those examples, the remote development environment 152-1 may send out a general request to one or more of the remote machines and the packaging and deployment server 156 to identify the location of the file and to request access to the file.

Update agent 124 is configured to manage changes made to the source code. Update agent 124 may automatically identify the changes made to an edited source code and the impact of those changes on other source code deliverables within a project. For example, if an interface is modified, such as an application programming interface, with an added additional variable that is used as input to a particular function declaration, update agent 124 may identify the particular changes that were made and source code deliverables that call the modified function. In addition, update agent 124 tracks and stores the associations between the modified source code file and affected source code deliverables. In some examples, the update agent 124 waits changes made to a particular source code file have been completed to identify the changes and source code deliverables that need to be reconciled. In some examples, the update agent may wait until the modified source code file is committed to a central repository or local memory. In some examples, multiple source code deliverables may be modified at the same time in which case the update agent 124 may identify the changes and impacts to the source code deliverables of the project when the work on the deliverables is completed. In other examples, the update agent 124 tracks the changes made to the source code file and the potential impact to the source code deliverables of the project in real time thereby enable the immediate identification of the impact of changes to the source code.

Once work completes for a particular software source code file, the update agent 124 identifies the source code deliverables that have been and may be modified to reconcile a code changes. Collectively, these are included in the set of source code deliverables 128 that will be sent to the client devices 168 to update the software executing on client devices 168. One or more rules 144/164 are invoked on the set of source code deliverables 128. The one or more rules identify source code deliverables that satisfy a condition of the one or more rules. If a condition of a rule is satisfied, then the rule marks metadata 132 corresponding to the source code file with a particular identifier. The rules may be stored locally such as in rules database 144 or retrieved from a remote rules database 164. In some examples, remote development device 152 may keep a local copy of the rules and immediately prior to invoking them on a set of source code deliverables determine if the rules database 144 is up-to-date by requesting a manifest from the packaging and deployment server 156. In other examples, remote development environments may use a local set of rules. In other examples, a remote development environment 152 may obtain the rules from one or more other remote development environments 152-1, 152-2, 152-3, . . . 152-n.

Dependency engine 136 uses the markings in the metadata 132 by rules 144 to identify decencies within the set of source code deliverables 128. In some examples, dependency engine 136 uses metadata 132 to identify particular metadata identifiers associated with the source code. Dependency engine 136 may identify a subset of the set of source code deliverables 128 that have particular identifier. The subset may also include deliverables that may have a dependency on the marked source code deliverables. Dependency engine 136 identifies from one or more source code deliverables that may be transmitted separately from one or more other source code deliverables. For example, a rule may mark metadata corresponding to the source code deliverables that use a certain dynamic link library to execute. Dependency engine 140 may identify these source code deliverables as independent from a remaining set of source code deliverables. The independent subsets of source code deliverables may be identified as separate projects that can be packaged and deployed to client devices 168. In some examples, once the separate projects are identified a client device 168 may select one or more of the separate projects to receive. In some examples, despite identifying separate projects, the dependency engine may aggregate some of the smaller projects into a larger project.

Code packager 140 takes a project and packages the source code of the project into a software package that can be deployed to a client device 168. In some example, packaging source code includes compiling the source code deliverables of the project into machine code binaries, adding a package description, a package version, and any additional dependencies that may be added prior to installing the package (e.g. libraries and the like). In some examples, packaging does not compile the source code deliverables as the packages includes source code deliverables in their uncompiled state (e.g. as class deliverables or the like). The client device 168 may then compile the source code deliverables once received. In other examples, the source code deliverables are compiled into intermediate language (IL) code or Java bytecode. In those examples, the IL code (or bytecode) may be further compiled into binary on the client device 168, or interpreted by a virtual machine such as a Java virtual machine (VM).

Once the code package 140 generates a software package out of a selected project for deployment, remote development environment 152 may deploy the package for installation by a client device 168. In some example, the software package is deployed to one or more client devices directly from any one of the remote development environments 152. In some examples, the remote development environment may generate the software package and send it to the packaging and deployment server 156 for validation and/or verification. Packaging and deployment server 156 may then deploy the software package directly to the client devices 168. In other examples, packaging and deployment server 156 includes a packaging and deployment instance (such as that depicted by 120) that accepts changes to the source code made by remote development devices 152, provides the dependency engine and analysis, and generates the package for deployment to the client devices 168. In those examples, packaging and deployment server 156 may act by the direction of remote development devices 152, a separate user, or by any one of the client devices 168.

Figure 2:
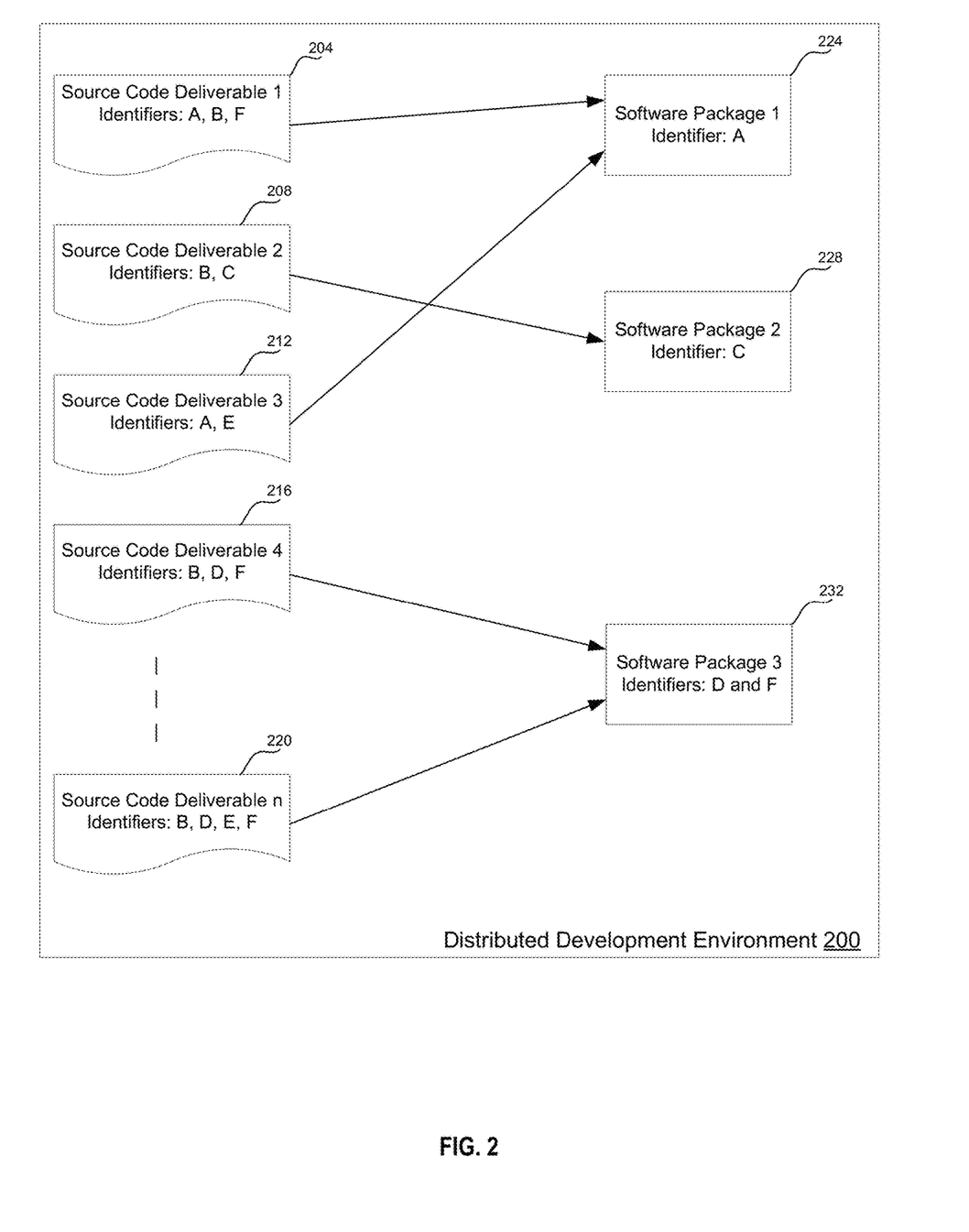
FIG. 2 illustrates an exemplary identification of deliverables to be included in software packages.

Turning to FIG. 2 depicting an exemplary identification of source code deliverables within a deliverable that may be placed into one or more packages. The remote development device within the distributed development environment operates on a source code repository to develop software and to support that software with patches/updates. Software updates may include software upgrades, new features, bug fixes, new applications, or combinations thereof that are developed by or otherwise supported by remote development devices of distributed development environment 100. In some examples, remote development device may provide a patch that includes one or more software upgrades, new features, bug fixes, and/or applications to more than one software application. In some examples, the patch may be divided into smaller projects. The project may be packaged to deploy an upgrade, new feature, bug fix, or the like. Rules database (e.g. 148 and 164 of FIG. 1) provides a series of rules that can be executed on a set of source code deliverables to distinguish dependencies. For example, a first rule can distinguish source code deliverables that corrects a bug from source code deliverables that add an additional feature or upgrade. The source code deliverables can be placed into a project and packaged into a patch enabling a client device to obtain and install software modifications on an individual basis.

Source code deliverables can include a variety of distinct dependencies that may indicate, for example, that a source code deliverable uses another source code deliverable for operability. For example, a first source code deliverable may modify a function declaration requiring another source code deliverable to modify the places where the function is called. In another example, a first source code deliverable directed to a particular new feature for an application may use a second source code deliverable to enable the feature on a client device. The rules applied to the source code deliverables add particular metadata identifiers to metadata of the source code deliverables. The metadata may be stored locally or remote (e.g. 160 of FIG. 1). In some examples, the metadata is updated in real time as the remote development device modifies to a source code file. In other examples, the metadata is updated upon some predefined event such as, but not limited, when the source code deliverable is modified, checked-in, placed in a project with other source code deliverables, packaged, compiled, debugged, or the like.

FIG. 2 depicts a plurality of source code deliverables 204-220 that make up a large software patch for one or more client devices. The source code deliverables may be directed to one or more upgrades, new features, bug fixes, new applications, or the like. Hard rules may be executed on the source code deliverables to add particular metadata identifiers to the metadata of one or more source code deliverables that identifies the rule. For example, a source code file may satisfy ten rules and the metadata associated with that source code file may include ten particular metadata identifiers. Source code deliverables may not satisfy any of the rules and the metadata associated with the deliverable may be free of any particular markings. Source code deliverables may satisfy none, one, some, or all of the rules and the metadata associated with the source code file may include none, one, some, or all (respectively) of the particular metadata identifiers corresponding to the satisfied rules. While the exemplary marking depicted in FIG. 2 uses letters, in some examples, an alphanumeric set of characters, a hash function (e.g. MD5, any of the functions in SHA-0, SHA-1, SHA-2, or SHA-3 hash families, or the like), a universally unique identifier, or the like may be used to generate a particular identifier. Other such methods may be employed to indicate that a particular rule is satisfied by the source code deliverable.

Rules database (e.g. 148 and 164 of FIG. 1) detects properties of a source code deliverable as it pertains to particular software upgrades, new features, bug fixes, new applications, or the like. In some examples, rules may be based on a naming convention of the source code deliverable. For example, a naming convention may name deliverables based on a particular property of the source code deliverable. The particular property can include any one or more of the following: functional area, owner, feature, configuration objects, installation objects, available metadata/file properties, program content and libraries used, frequency of modification, status of the deliverable being existing/new, imports of internal and external libraries, objects requiring specific versions of environmental or external factors, and the like. The naming convention of the source code deliverable may include the naming of the file itself or the naming of any of the variables, instructions, functions, objects, classes, interfaces, or the like within the source code deliverable. In those examples, a rule marking source code deliverables that belong to a particular application such as Peoplesoft may be satisfied by a class file labeled "Peoplesoft_user_profile." In another example, that same rule may be satisfied upon analyzing a source code deliverable comprising a function declaration such as "public void UpdatePeoplesoftUserProfile( )." In some examples, rules may be satisfied based on properties of the metadata corresponding to the source code deliverables. For example, rules may be satisfied upon detecting new source code deliverables, new objects, frequently modified source code deliverables, frequently modified objects, the size of a source code deliverable, and the like. In other examples, rules may be satisfied based on an properties associated with a source code deliverable including any one or more of a product name, a folder structure, or a naming convention.

The rules may include a rule type that classifies the rule as a hard rule or a soft rule. The rules are expressed as structured query language (SQL) statements that can be obtained from an JavaScript Object Notation (JSON) file. In some examples, the JSON file is exposed to a web application that enables central storage of the hard and soft rules that can be accessed and applied to source code deliverables over a network. Hard rules can be executed automatically by distributed development environments (e.g. 152 of FIG. 1) and by the packaging and deployment instance (e.g. 156 of FIG. 1) to include particular metadata identifiers in metadata corresponding to the source code deliverables. The particular metadata identifiers may then be used to automatically divide the marked source code deliverables into sets of projects. The hard rules may automatically execute in a dynamic manner such as immediately upon one or more source code deliverables being created, modified, and/or deleted. In some examples, the hard rules may execute when a remote development device completes work on one or more source code deliverables and attempts to check those deliverables back into a central repository. In other examples, the hard rules may automatically execute when the source code deliverables are placed into a project such as when a remote development device designs a new software update. In some examples, the hard rules may automatically execute when the source code deliverables are compiled into object code, intermediate language, or machine code. Remote development device may also initiate the automatic execution of the hard rules through input into the remote development environment (e.g. a button, menu selection, command line command, or the like). Once the hard rules execute, a set of project data may be generated and populated with the source code deliverables that correspond to one or more particular metadata identifiers.

Soft rules execute at the same time as hard rules and also include particular metadata identifiers in the metadata associated with the source code deliverables. Soft rules generate messages to the remote development device that may be satisfied manually. In some examples, soft rules may be based on a naming convention, dependency, frequency of delivery of the source code file to client devices, audit rules, missing metadata, or the like. A satisfied soft rule triggers a message to a remote development device enabling the remote development device to manually add or remove certain source code deliverables associated with the soft rule. For example, audit rules may be used to enforce best practices or other software development conventions. An audit rule may trigger a message that certain deliverables are missing documentation. In some examples, the audit rules may warn of syntax errors, other errors in the source code, improper or inappropriate coding standards, or the like. The soft rules enable a remote development device to intervene and separate or group source code deliverables into projects based on the information gained by the soft rule. For example, a soft rule may indicate a particular source code file is frequently delivered to a client device with another source code file. The soft rule may trigger a message to a remote development device indicating the relationship between the source code deliverables and suggest the remote development device maintain delivering the two deliverables together. In that example, there may not have been a dependency requiring the deliverables be packaged together, but the soft rule may indicate a convention that may be followed for a particular client device. In some examples, the soft rules may trigger display of alert messages along with explanations, possible solutions, or the like. In some examples, the messages may a enable some manner of user input such as adding or removing a particular file to a project or indicating acknowledgment of the message.

FIG. 2 depicts an exemplary set of packages (e.g. package transmission) 224, 228, and 232. The first package includes the source code deliverables whose metadata is includes the particular metadata identifier 'A.' The distributed development environment will identify the particular metadata identifiers of the source code deliverables (e.g. using the dependency engine 144 of FIG. 1). In the exemplary depiction of FIG. 2, source code file 1 and source code deliverable 3 have metadata that includes the particular metadata identifier 'A.' Thus, the first package 224 includes two source code deliverables 204 and 212. The second source code package includes the particular metadata identifier 'C.' One source code deliverable has the corresponding particular identifier. The second package 228 includes a source code deliverable 208. Package 3 includes source code deliverables having metadata marked with two particular metadata identifiers 'D' and 'F.' These identifiers are found in source code deliverables 216 and 220 which are then included in the third package.

Although three packages are depicted any number of packages may result from marking the metadata of the source code deliverables. In some examples, some of the source code may not end up in a package. In other examples, a source code deliverable may be added to two or more packages. A package may indicate any number of particular metadata identifiers as a condition (e.g. 1, 2, . . . n markers). In some examples, the markers may use Boolean logic to identify the source code deliverables. For example, a package may indicate (((A and B) or C) not D). In that example, source code deliverables including particular metadata identifiers 'A' and 'B' would be added to the project along with source code deliverables that include 'C.' Any source code deliverable including D would be expressly omitted from the package.

Figure 3:
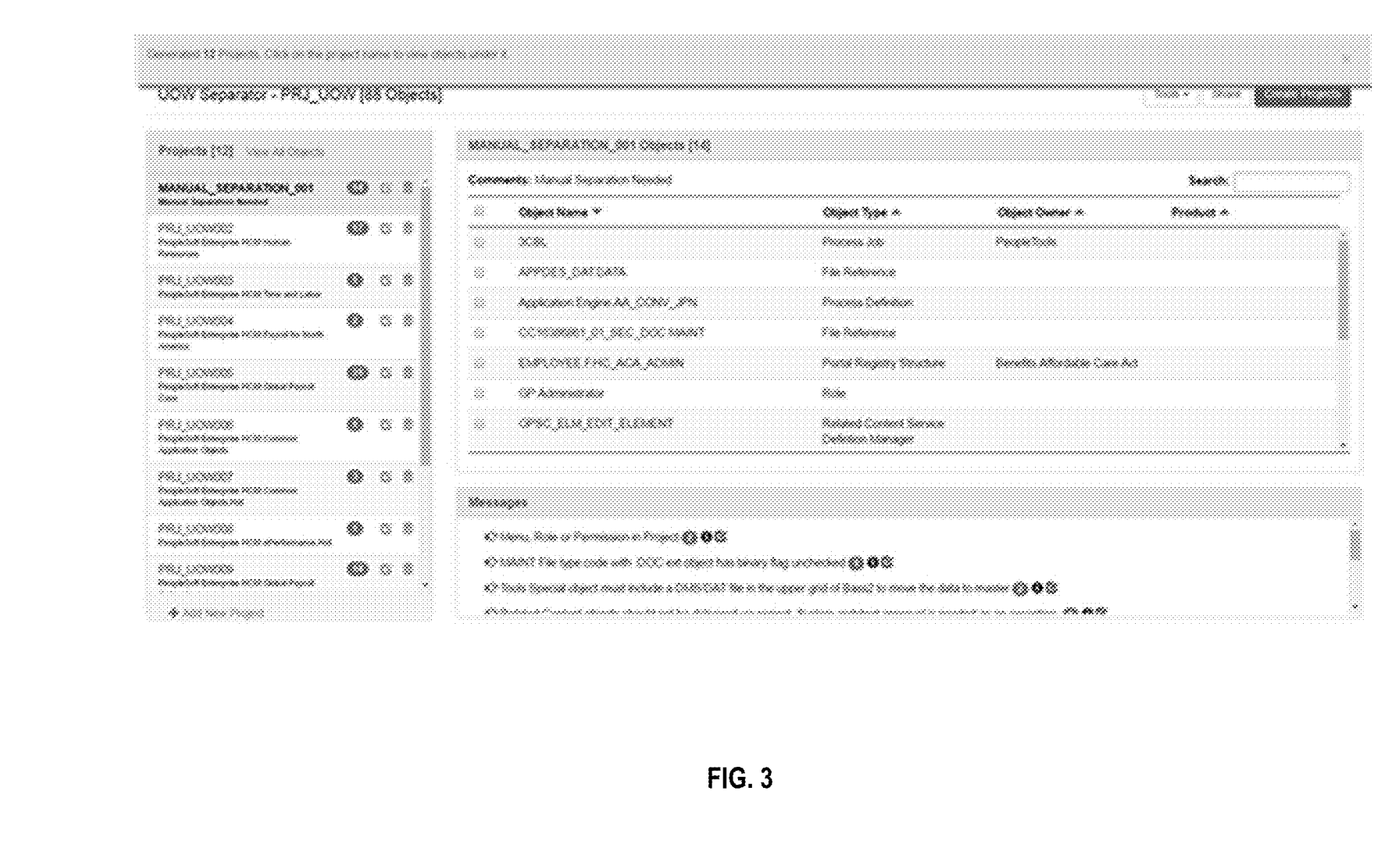
FIG. 3 illustrates an exemplary graphical user interface of a distributed development environment.

Turning to FIG. 3 depicting an exemplary user interface of a remote development environment. The user interface depicts a set of projects where a project contains one or more source code deliverables. Selecting a particular project identifies the contents of the project (e.g. displaying the deliverables) as well as the deliverable type, owner, and product associated with the file. The bottom portion of the user interface depicts messages such as those generated by the execution of the soft rules. The messages may be categorized according to a message type such that when a message is selected the messages associated with that type may then be displayed.

Figure 4:
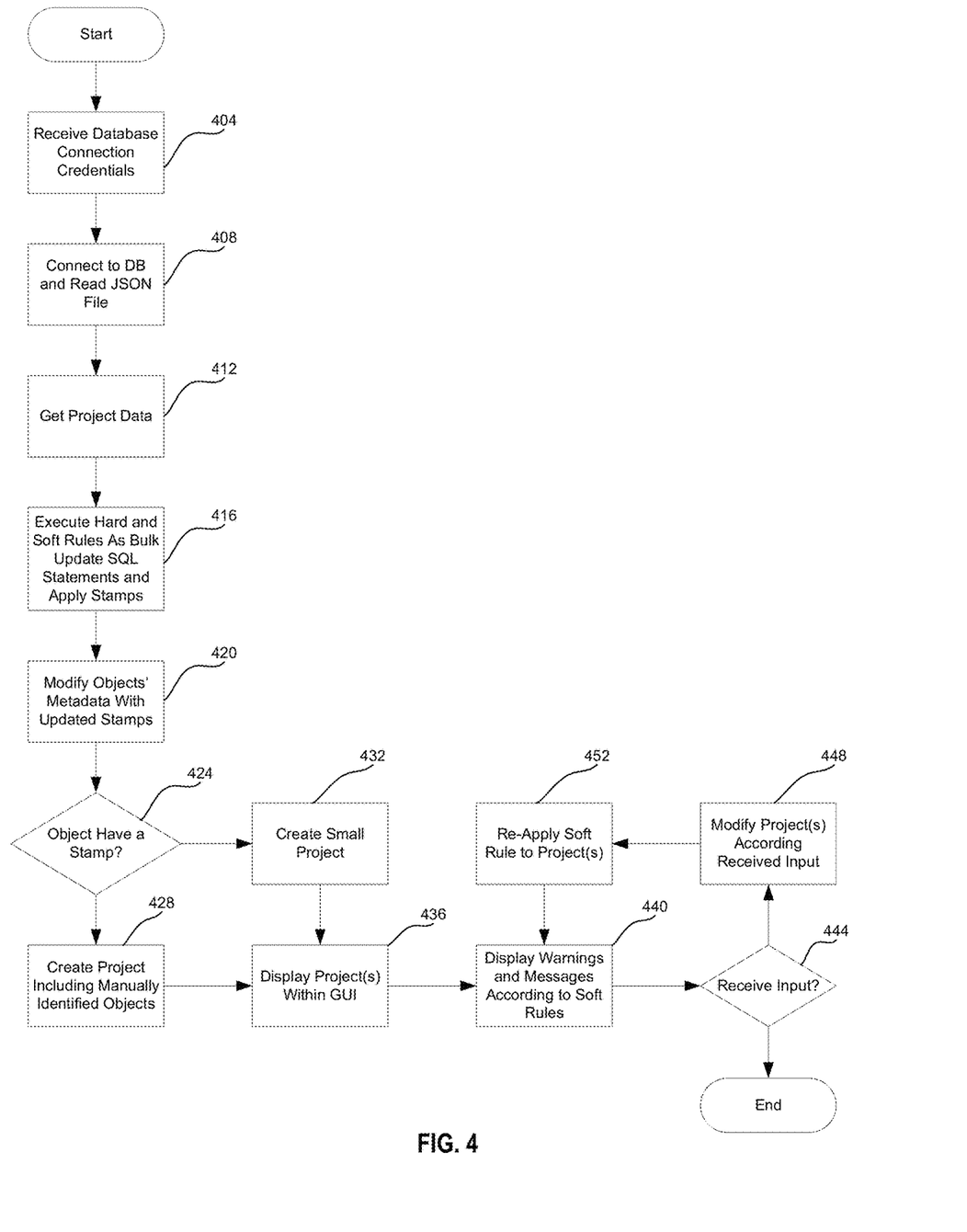
FIG. 4 illustrates an exemplary flowchart for identifying independent packages from a larger deliverable.

Turning to FIG. 4 depicting an exemplary method of automatically generating deployment data defining one or more discrete packages for transmitting executable software deliverables is disclosed. The process flow begins at 404 when a server (e.g., packaging and deployment server 156 of FIG. 1) receives database connection credentials from one or more remote devices (e.g., distributed development devices 152 of FIG. 1). The credentials verify the identity and access rights of remote development device working on a software development project. In some examples, a single-factor authentication may be employed. In other examples, a stronger authentication method may be employed such as two-factor, multi-factor, continuous-factor, or the like. The database stores source code deliverables that make up one or more versions of a software development project. The database may store a current version of the project as well as one or more previous versions of the project, where each version includes a set of source code deliverables along and metadata indicating the version of each source code deliverable that is included in that version. Once authenticated, the server may receive new source code deliverables, modified source code deliverables, or commands to delete a source code, and/or the like from one or more remote devices. In some examples, a modification to the deliverables of the database triggers the generation of deployment data identifying source code deliverables to include in one or more package transmissions. In other examples, the remote development device may receive input that begins building the software patch in manual or semi-manual process upon receiving modified deliverables.

At step 408, a JSON file is loaded. The JSON file stores a set of hard and soft rules encoded in a SQL format. In some examples, the JSON file is exposed to a web application to enable remote loading and application of the rules. The process then moves to step 412 where a particular project is identified. A project includes a set of source code deliverables grouped for a particular purpose (e.g. a software upgrade/modification/patch, an application, a tool, a feature, and/or the like). For example, a remote development device may implement changes to multiple tools by modifying and sending multiple modified source code deliverables to the server. The resulting project may include the source code deliverables and dependent (or related) deliverables.

At step 416, the set of hard and soft rules (obtained from the JSON file) may be applied to the source code deliverables in the project. At step 420, the hard and soft rules add a particular metadata identifier to metadata corresponding to the source code deliverables when a condition of the rule is satisfied. In some examples, the rules define the dependencies and relationships of the deliverables within a project. The metadata can then be used to define a set of packages transmissions that may be transmitted and installed separately from each other to implement part or all of the project. The hard and soft rules are represented in SQL notation and can be automatically or manually selected by a remote development device. When automatically selected, the server will identify the metadata associated with the source code deliverables and (in some examples) apply machine learning to determine the rules applicable to that source code file. The application of the hard and soft rules additionally gathers data that indicates the efficiency of the applied rules in identifying discrete packages. Subsequent applications of the hard and soft rules may use the data to improve the selection of the rules to apply to deliverables. In some examples, each rule in the JSON file are executed regardless of any selection.

At step 424, the server analyzes the metadata associated with the source code deliverables to determine the particular metadata identifiers in the metadata. If no particular metadata identifier is found for a source code deliverable then the process moves to step 428 in which the remote development device is directed to manually identify and create the independent project(s) (if any) for that source code deliverable and the process moves to step 436. If a particular metadata identifier is detected, then source code deliverables with the same identifier are packaged into the same project. Step 424 continues until the metadata associated with the remaining source code deliverables are analyzed for particular metadata identifiers. In some examples, a source code deliverable appears in only one project. In other examples, a source code deliverable may appear in multiple projects. For example, a new tool and a modification of an existing tool may use the same application programming interface (API) file. Thus, the API file may be placed into the project that deploys the new tool and the project that deploys the patch to the existing tool. Once the metadata has been scrutinized, at step 436 a display device displays a graphical user interface depicting the smaller projects (such as the exemplary interface of FIG. 3).

The graphical user interface enables a remote development device to select one or more of the smaller projects. At step 440, the results of the soft rules are displayed for a selected project. Unlike the hard rules that enable the automatic division of the source code deliverables, the soft rules generate warning messages, alerts, and/or suggestions, that request manual or semi-manual input for the placement of one or more source code deliverables. For example, the metadata associated with a source code deliverable may be incomplete, missing, or corrupted and therefore could not be marked. In another example, the naming convention of the source code deliverable may deviate from a distinct convention thereby rendering the server uncertain as to which naming convention is applicable to the deliverable. The soft rules may indicate a suggestion that a source code deliverable may or may not be placed in a given smaller project. In some examples, the soft rules include messages regarding source code deliverables that may be extraneous to the purpose of a smaller project. In some examples, the soft rules include messages regarding source code deliverables that may be missing from the project.

At step 444, user input is accepted to modify the selected project based on the warning messages, alerts, and/or suggestions. If no input is entered then at step 444, the process terminates. If user input is entered, the process moves to step 448 where the user input directing the modification of the project based on the message (e.g. by adding or removing a particular source code deliverable from the project that triggered the message) is accepted. In some examples, the modification may be tangent to the message itself such as adding a different source code deliverable than the deliverable suggested by the message. Modifying the project causes the soft rules to be reapplied to the project at step 452. Reapplying the soft rules enables the remote development device to see the effect of the modification in step 448. For example, it may be that adding a source code deliverable as directed triggers another soft rule thereby generating a new message. In some examples, modifying the projects at 448 may return the process flow to step 416 where both the hard and soft rules are re-executed on the modified project. Thus, the process may repeat until no more messages are displayed or until no more input is received at step 444 at which point the process terminates.

Figure 5:
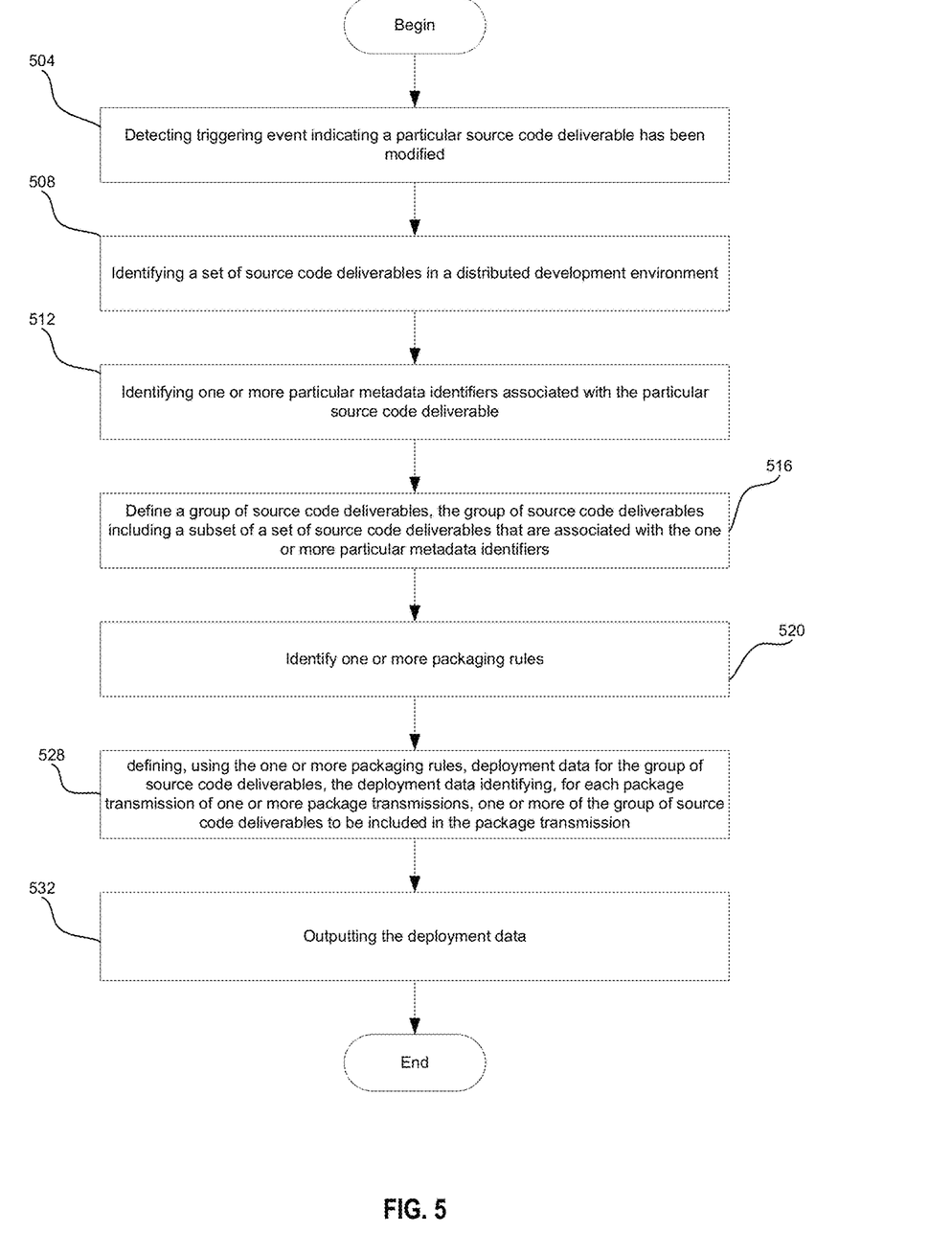
FIG. 5 illustrates an exemplary flowchart for identifying independent packages from updated source code deliverables.

Turning to FIG. 5 depicts an exemplary process for identifying a manner in which to divide a software package of source code deliverables into smaller discrete software packages. The process begins at step 504 where a triggering event such as when a remote development device modifies one or more source code deliverables of a software project is detected. The triggering event may occur when one or more source code deliverables are modified, checked-in, deleted, created or the like at a central server or concurrent versioning system. In some examples, the triggering event may be detected upon the generation of a software update/patch that, when executed, would incorporate modifications into a version of an application. In other examples, the triggering event may be manual initiated by a client, server, or remote development device. Generally, the triggering event may be any conditional event selectable by a client, server, or remote development device that may be automatically or manually triggered.

At step 508, a set of source code deliverables are identified. The set of source code deliverables may be related to a software update for an existing application or tool, or to a new application or tool. Each source code deliverable of the set of source code deliverables includes metadata describing the relationship the source code deliverable may have with other source code deliverables of the set. At step 512 one or more particular metadata identifiers associated with the modified one or more source code deliverables are identified.

The one or more particular metadata identifiers may be indicative of (for example) contents of a source code deliverable (e.g. variables, functions, documentation, annotations, naming convention of the contents, or the like), properties of a source code deliverable (e.g. naming convention of the deliverable, size, type, owner, purpose, date/time the deliverable was created, last time the deliverable was modified, or the like), or metadata (e.g. the number of particular metadata identifiers, specific particular metadata identifiers present, or the like). The metadata may enable identifying a group of source code deliverables that include the updated deliverable(s) and one or more related deliverables. Each source code deliverable in the group can relate to (for example) a same product, feature, folder structure, library, function, and/or update timestamp.

At step 516, a group of source code deliverables is defined. The group of source code deliverables includes a subset of the set of source code deliverables that each have metadata that is also associated with the one or more particular metadata identifiers. In some examples, each source code deliverable of the subset is associated with one, some, or all of the one or more particular metadata identifiers. In other examples, Boolean logic is used to define the one or more particular metadata identifiers that indicate the source code deliverables to be included in the group.

At step 520, one or more packaging rules are selected. In some examples, each packaging rule defines content for package transmission based on a metadata assessment. In some examples, the metadata assessment includes an inspection of the metadata of each source code deliverable in the group of source code deliverables. In some examples, the metadata assessment may be expanded to include the metadata of all source code deliverables in a source code deliverable database and/or metadata present at one or more remote development devices. In those examples, a first source code deliverable may depend on a third party library located on a remote development device. The metadata of the library may indicate a version of a source code deliverable that implements one or more functions of the library. The a rule may use the metadata assessment to analyze the metadata of the first source code derivable to identify the library, the metadata of the library to identify the version tree, and the metadata of each possible compatible version of implementing source code deliverable to determine which implementing source code deliverable should be included in a package transmission with the first source code deliverable.

In some examples, the one or more packaging rules may organize source code deliverables into packages based on a size threshold for each deliverable (e.g., indicating that a package is to include a single deliverable when the deliverable exceeds the size threshold), a size threshold for the package (e.g., separating deliverables such that each package does not exceed the size threshold), a relationship between the deliverables (e.g., indicating that a package is to include the deliverables sharing a common relationship), a frequency in which a deliverable is transmitted or updated (e.g., indicating that a package is to include a single deliverable when the deliverable exceeds the frequency threshold) a type of deliverable (e.g., indicating that a package is to include the deliverables that are of the same type), a type of package (e.g., indicating that a package is to include the deliverables associated with the package's type), as software application or tool associated with the group of source code deliverables (e.g., indicating that a package is to include the deliverables associated with the software application or tool), the presence or absence of one or more particular metadata identifiers (e.g., indicating certain source code deliverables associated with certain identifiers should be packaged together or separately), any combination thereof, or the like.

In some examples, the one or more rules may add or reduce the number of source code deliverable that may be included in a packaging transmission. For example, if a particular metadata identifier indicates the source code deliverable is over a certain size threshold (e.g. 32 Mb), then a first rule may package the deliverable into a separate package transmissions. This prevents the package transmission from becoming too large or inefficient to transmit. In some examples, a second rule may supersede the first rule and indicate that despite the large size of a deliverable it should be packaged with other such deliverables (e.g., to maintain the package being configured to be independently installed). Thus, in some examples the rules may operate in a hierarchy in which some rules have higher priority than others.

At step 528, deployment data is defined by applying the one or more rules to the group of source code deliverables. In some examples, the deployment data may apply the one or more rules to define (or create) one or more package transmissions that may be separately transmitted and installed. Each of the package transmission may include one or more source code deliverables from the group of source code deliverables. In some examples, the deployment data identifies a plurality of package transmissions such that each source code deliverable in the group of source code deliverables is included in at least one package transmission. In other examples, only a portion of the source code deliverables in the group of source code deliverables are included in package transmissions.

Package transmissions may additionally include other content (e.g. metadata, software, binaries, installers, other packages, etc.). For example, metadata may include software/application name, description of the package's purpose, version number, vendor, intended client, checksum, and a full list of dependencies, or the like. In some examples, the source code deliverables within the package transmission may be compiled into bytecode, intermediate language code, or object code (e.g. machine code or register transfer language code) such that the software package can be immediately executed or interpreted by the client device. In some examples, the package transmissions may include the raw source code deliverables that are compiled or further manipulated once delivered to the client device.

The deployment data may be output at step 532. In some examples, the deployment data may be output to an interface of one or more remote development devices (e.g. interface 108 of FIG. 1), Packaging and Deployment Server (156 of FIG. 1), and/or one or more client devices (168 of FIG. 1) or stored in a central repository. In some examples, the deployment data may be accessed (locally or remotely) by one or more client devices, the server, remote development devices such as (for example) to facilitate generating one or more of the package transmissions in the deployment data (automatically or manually). In some examples, a remote development device or server may push the deployment data or package transmissions onto the one or more clients. The clients may use the deployment data to generate the select and obtain the package transmission. The package transmissions may be transmitted to the client devices in series, in parallel, in a particular order, partially ordered, or at random.

In some examples, the deployment data may be displayed through a display device to identify the contents of each package transmission. Deployment data may be compared to other deployment data (e.g., past versions, previously generated, or future generated deployment data). Such a display may depict a side-by-side view in which the package transmissions and their contents are easily identifiable and comparable. For example, identical package transmissions may be highlighted (e.g., in any particular manner or color) to indicate sameness, while differences (e.g. one package transmission having a source code deliverable or missing one as compared to another package transmission) may be highlighted to show difference.

Once the deployment is output the process of FIG. 5 terminates. Although not shown, in some examples, the output deployment data may be further manipulated by re-executing one or more steps of FIG. 4 or 5 or by user input until the deployment data is approved. Approval may be based on machine learning (e.g., using data from a previous execution of the methods and systems herein), a user, remote development device, the server, one or more client devices, voting one or more of the server and devices, one or more predefined constraints, completeness of the deployment data (e.g., based on the one or more package transmission satisfying one or more metrics), or the like.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    detecting, by a computing device, a triggering event indicating that a particular source code deliverable has been updated;
    identifying, in response to the detecting and by the computing device, a set of source code deliverables in a distributed development environment, each source code deliverable of the set of source code deliverables including metadata, and each source code deliverable being a file, element, or object and including executable content;
    identifying, by the computing device, one or more particular metadata identifiers in metadata of the particular source code deliverable, the one or more particular metadata identifiers indicating one or more other source code deliverables to be deployed with the particular source code deliverable;
    identifying a subset of the set of source code deliverables using the one or more particular metadata identifiers, each source code deliverable included in the subset of the set of source code deliverables being associated with a metadata identifier of the one or more particular metadata identifiers;
    defining, by the computing device, a group of source code deliverables to be packaged and transmitted to a client device, the group of source code deliverables including the subset of the set of source code deliverables;
    identifying, by the computing device, two or more packaging rules, each packaging rule of the two or more packaging rules identifying a technique for defining content for one or more package transmissions using a metadata assessment, the two or more packaging rules operating in a hierarchy such that if a higher priority packaging rule conflicts with a lower priority packaging rule, the higher priority packaging rule of the two or more packaging rules supersedes the lower priority packaging rule;
    defining, using the two or more packaging rules and by the computing device, deployment data for the group of source code deliverables, the deployment data identifying a plurality of package transmissions, each package transmission of the plurality of package transmissions including one or more of the group of source code deliverables to be transmitted by the package transmission, and each package transmission of the plurality of package transmissions being configured to occur separately, wherein the plurality of package transmissions transmit each source code deliverable of the group of source code deliverables wherein defining the deployment data includes:
        identifying, by applying a first packaging rule of the two or more packaging rules, one or more source code deliverables to include within a first package transmission of the plurality of package transmission;
        determining that application of the first packaging rule causes the first package transmission to violate a second packaging rule of the two or more packaging rules;
        determining that the second packaging rule is of a lower priority than the first packaging rule; and
        superseding the second packaging rule with the first packaging rule such that the first packaging rule replaces an effect of the second packaging rule; and
    outputting, to an interface of the computing device, the deployment data.

2. The method of claim 1, wherein outputting the deployment data includes transmitting a package transmission of the plurality of package transmissions to one or more client devices.

3. The method of claim 1, wherein outputting the deployment data includes generating one or more notifications for display via the interface of the computing device, the interface configured to accept user input in response to displaying the one or more notifications.

4. The method of claim 1, wherein the one or more particular metadata identifiers are included in the metadata of the set of source code deliverables, and wherein the one or more particular metadata identifiers are added to the metadata using a JavaScript Object Notation (JSON) configuration file.

5. The method of claim 1, wherein the one or more particular metadata identifiers indicates a dependency on a shared library and the subset of the set of source code deliverables includes the shared library.

6. The method of claim 1, wherein the one or more particular metadata identifiers is associated with a naming convention and the subset of the set of source code deliverables includes source code deliverables associated with the naming convention.

7. The method of claim 1, wherein a first rule of the one or more packaging rules includes a size threshold and wherein source code deliverables that exceed the size threshold are placed in separate package transmissions.

8. A system comprising:
one or more processors; and
a non-transitory machine-readable storage medium containing instructions, which when executed by the one or more processors, cause the one or more processors to perform operations including:
    detecting a triggering event indicating that a particular source code deliverable has been updated;
    identifying, in response to the detecting, a set of source code deliverables in a distributed development environment, each source code deliverable of the set of source code deliverables including metadata, and each source code deliverable being a file, element or object and including executable content;
    identifying one or more particular metadata identifiers in metadata of the particular source code deliverable, the one or more particular metadata identifiers indicating one or more other source code deliverables to be deployed with the particular source code deliverable;
    identifying a subset of the set of source code deliverables using the one or more particular metadata identifiers, each source code deliverable included in the subset of the set of source code deliverables being associated with a metadata identifier of the one or more particular metadata identifiers;
    defining a group of source code deliverables to be packaged and transmitted to a client device, the group of source code deliverables including the subset of the set of source code deliverables;
    identifying two or more packaging rules, each packaging rule of the two or more packaging rules identifying a technique for defining content for one or more package transmissions using a metadata assessment, the two or more packaging rules operating in a hierarchy such that if a higher priority packaging rule conflicts with a lower priority packaging rule, the higher priority packaging rule of the two or more packaging rules supersedes the lower priority packaging rule;
    defining, using the two or more packaging rules, deployment data for the group of source code deliverables, the deployment data identifying a plurality of package transmissions, each package transmission of the plurality of package transmissions including one or more of the group of source code deliverables to be transmitted by the package transmission, and each package transmission of the plurality of package transmissions being configured to occur separately, wherein the plurality of package transmissions transmit each source code deliverable of the group of source code deliverables wherein defining the deployment data includes:
        identifying, by applying a first packaging rule of the two or more packaging rules, one or more source code deliverables to include within a first package transmission of the plurality of package transmission;
        determining that application of the first packaging rule causes the first package transmission to violate a second packaging rule of the two or more packaging rules;
        determining that the second packaging rule is of a lower priority than the first packaging rule; and
        superseding the second packaging rule with the first packaging rule such that the first packaging rule replaces an effect of the second packaging rule; and
    outputting, to an interface of a computing device, the deployment data.

9. The system of claim 8, wherein outputting the deployment data includes transmitting a package transmission of the plurality of package transmissions to one or more client devices.

10. The system of claim 8, wherein outputting the deployment data includes generating one or more notifications for display.

11. The system of claim 8, wherein the one or more particular metadata identifiers are included in the metadata of the set of source code deliverables, and wherein the one or more particular metadata identifiers are added to the metadata using a JavaScript Object Notation (JSON) configuration file.

12. The system of claim 8, wherein the one or more particular metadata identifiers indicates a dependency on a shared library and the subset of the set of source code deliverables includes the shared library.

13. The system of claim 8, wherein the one or more particular metadata identifiers is associated with a naming convention and the subset of the set of source code deliverables includes source code deliverables associated with the naming convention.

14. The system of claim 8, wherein a first rule of the one or more packaging rules includes a size threshold and wherein source code deliverables that exceed the size threshold are placed in separate package transmissions.

15. A non-transitory machine-readable storage medium containing instructions, which when executed by one or more processors, cause the one or more processors to perform operations including:
    detecting a triggering event indicating that a particular source code deliverable has been updated;
    identifying, in response to the detecting, a set of source code deliverables in a distributed development environment, each source code deliverable of the set of source code deliverables including metadata, and each source code deliverable being a file, element or object and including executable content;
    identifying one or more particular metadata identifiers in metadata of the particular source code deliverable, the one or more particular metadata identifiers indicating one or more other source code deliverables to be deployed with the particular source code deliverable;
    identifying a subset of the set of source code deliverables using the one or more particular metadata identifiers, each source code deliverable included in the subset of the set of source code deliverables being associated with a metadata identifier of the one or more particular metadata identifiers;
    defining a group of source code deliverables to be packaged and transmitted to a client device, the group of source code deliverables including the subset of the set of source code deliverables;
    identifying two or more packaging rules, each packaging rule of the two or more packaging rules identifying a technique for defining content for package transmissions using a metadata assessment, the two or more packaging rules operating in a hierarchy such that if a higher priority packaging rule conflicts with a lower priority packaging rule, the higher priority packaging rule of the two or more packaging rules supersedes the lower priority packaging rule;

defining, using the two or more packaging rules, deployment data for the group of source code deliverables, the deployment data identifying a plurality of package transmissions, each package transmission of the plurality of package transmissions including one or more of the group of source code deliverables to be transmitted by the package transmission, and each package transmission of the plurality of package transmissions being configured to occur separately, wherein the plurality of package transmissions transmit each source code deliverable of the group of source code deliverables wherein defining the deployment data includes:

identifying, by applying a first packaging rule of the two or more packaging rules, one or more source code deliverables to include within a first package transmission of the plurality of package transmission;

determining that application of the first packaging rule causes the first package transmission to violate a second packaging rule of the two or more packaging rules;

determining that the second packaging rule is of a lower priority than the first packaging rule; and superseding the second packaging rule with the first packaging rule such that the first packaging rule replaces an effect of the second packaging rule; and outputting, to an interface of a computing device, the deployment data.

16. The non-transitory machine-readable storage medium of claim 15, wherein outputting the deployment data includes transmitting a package transmission of the plurality of package transmissions to one or more client devices.

17. The non-transitory machine-readable storage medium of claim 15, wherein outputting the deployment data includes generating one or more notifications for display.

18. The non-transitory machine-readable storage medium of claim 15, wherein the one or more particular metadata identifiers are included in the metadata of the set of source code deliverables, and wherein the one or more particular metadata identifiers are added to the metadata using a JavaScript Object Notation (JSON) configuration file.

19. The non-transitory machine-readable storage medium of claim 15, wherein the one or more particular metadata identifiers indicates a dependency on a shared library and the subset of the set of source code deliverables includes the shared library.

20. The non-transitory machine-readable storage medium of claim 15, wherein a first rule of the one or more packaging rules includes a size threshold and wherein source code deliverables that exceed the size threshold are placed in separate package transmissions.

* * * * *